May 21, 1940.  L. MOHAR  2,201,496
CURB INDICATOR FOR MOTOR VEHICLES
Filed June 8, 1937
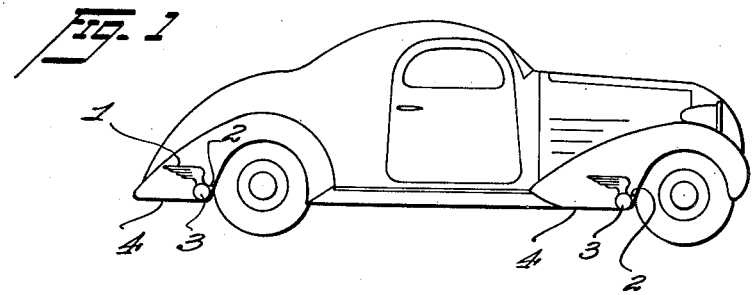
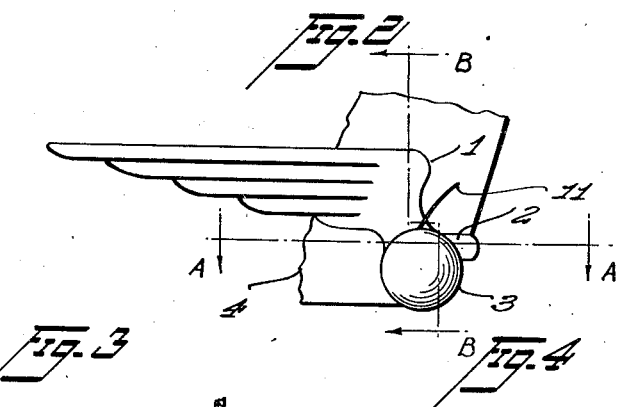
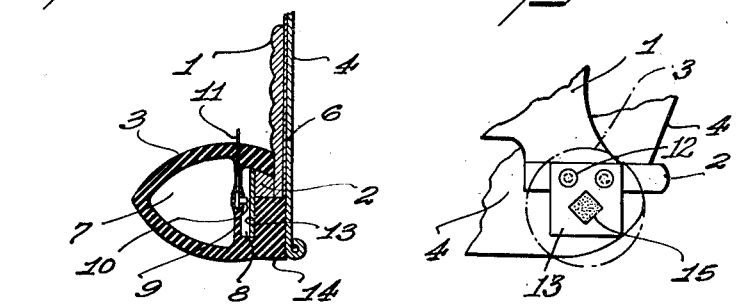
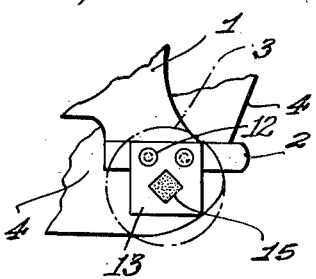
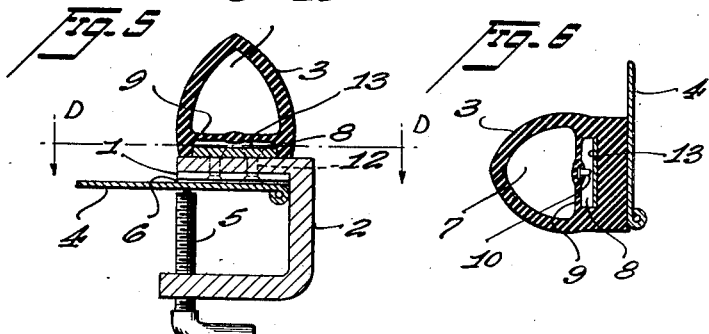
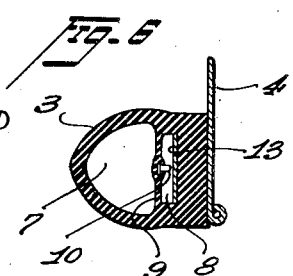
Inventor
Ludwig Mohar
By Lacey & Lacey, Attorneys Patented May 21, 1940

2,201,496

UNITED STATES PATENT OFFICE 2,201,496

CURB INDICATOR FOR MOTOR VEHICLES

Ludwig Mohar, Long Beach, Calif.

Application June 8, 1937, Serial No. 147,053

2 Claims. (Cl. 200—83)

My present invention relates to a curb indicator for automobiles of low body design.

The principal object of my invention is to provide means for audibly or otherwise warning and informing the driver, when the vehicle approaches near an interfering high curb, a wall, post or other vehicle. This device is essential particularly when backing the vehicle into a parking space, such as, along-side an interfering high curb.

An important object of this invention is the provision of such means, to warn the driver in time to avoid colliding with the interfering objects.

Another important feature of this invention is, the device provides means, which is ornamental in appearance and adds to the appearance of the car.

Another object of the invention is the provision of such means, that the protruding member of the device may be easily replaced and the device readily attached or detached to its place.

Another object of the invention is to provide an improved switch that is simple and durable.

Another object of the invention is the color of the protruding member, such as red, to serve as lateral warning device.

With these and other objects in view as will appear hereinafter, I have devised an article having certain novel features of construction, as will be hereinafter described in detail and particularly set forth in the appended claims, reference being had to the accompanying drawing and to the characters of reference thereon which form a part of this application, in which:

Fig. 1 is a view showing device attached to two right fenders of an automobile.

Fig. 2 is an elevation view of device attached to fragment of fender and showing associated parts.

Fig. 3 is a sectional view on line B—B, Fig. 2.

Fig. 4 is a sectional view on line D—D, Fig. 5.

Fig. 5 is a sectional view on line A—A, Fig. 2.

Fig. 6 is a sectional view, somewhat similar to Fig. 3 and taken on the same line therewith, but showing the protruding member partly depressed and contact closed.

My device as illustrated in Fig. 3, consists essentially of a pneumatically, movable contact 10, a cushion 6, metal wing 1, a U clamp 2, and a protruding member of resilient material 3.

Similar numerals refer to similar parts throughout the several views.

The wing 1, may be placed at the outer side of a fender 4, and arranged longitudinal of the vehicle, as shown on Fig. 1, this presents an ornamental or decorative appearance and provides the device with a firm cushioned seat. The said wing is connected to the U clamp 2, the latter straddles the edge of fender as shown on Fig. 5, and is secured to the fender by a screw 5, extending through the inner leg of the said clamp. Fabric or rubber 6, is cemented to the back of the wing member, to provide a cushioned seat for said wing and avoids damage to the fender, furthermore there is an inward distortion of the said wing in order to fit perfectly to the fender.

The protruding member 3, is positioned lower and near the normally forward end of the device. This protruding member in this instance is bullet shape and is hollow forming an air-tight chamber 7, and in the base 14, of the said protruding member is a cavity 8. The sealed chamber 7, and cavity 8, are separated by a thin, yieldable and resilient wall 9, and said wall partially embeds contact 10, this a movable contact is electrically connected with insulated wire 11, Fig. 3, to any desirable signaling means, such as, light, buzzer or horn, (not shown).

On the outside of the U clamp 2, Fig. 4, there is riveted, by means of rivets 12, a contact plate 13, said plate is adopted to anchor the protruding member 3, in place and also provides the stationary contact. The center of said plate is roughened at 15, to provide a better contact. To assure a firm hold on the protruding member 3, there is allowance for compression of the said member at the base 14.

From this brief description is seen that when the protruding member 3, contacts any interfering objects, becomes distorted and air in the chamber 7, to be compressed. The said compressed air serves to transmit movements to the yieldable resilient wall 9, which supports the contact wall 10, said wall is forced inwardly causing the movable stationary contact 10, to touch the contact plate 13, thus completing the electrical circuit. When pressure on the protruding member is released said member regains its shape and said contacts are broken. The said contacts are normally maintained out of electrical contact with each other.

I claim:

1. A pneumatically operated switch comprising a protruding body of resilient material, said body having therein an air-tight chamber and an open cavity for receiving a fastener to anchor the said protruding body upon a support, said body having a resilient wall, a stationary contact in said cavity, a contact carried by said wall in position to be moved into engagement with the stationary contact by the distortion of the wall between the said chamber and said cavity when the air in said chamber is compressed, and means for normally maintaining said switch out of electrical contact.

2. A switch comprising a hollow body of resilient material, a resilient partition in said body dividing the same into a sealed chamber and an open cavity, said partition being adapted to be flexed by air pressure when air in the chamber is compressed, a plate to provide the device with a wide firm seat, a rigid clamp secured to said plate and extending through said cavity, a contact plate carried by said clamp within the cavity, and a contact carried by said partition for engaging the contact plate when the partition is flexed towards the contact plate.

LUDWIG MOHAR.